Patented Nov. 19, 1940

2,221,965

UNITED STATES PATENT OFFICE 2,221,965

CHROMABLE DYESTUFFS OF THE TRIARYL-METHANE SERIES AND PROCESS OF PREPARING THEM

Wilhelm Eckert and Karl Schilling, Frankfort-on-the-Main-Hochst, Germany, assignors to General Aniline & Film Corporation, a corporation of Delaware No Drawing. Application September 13, 1938, Serial No. 229,768. In Germany March 27, 1936

4 Claims. (Cl. 260—335)

The present invention relates to chromable dyestuffs of the triarylmethane series and to a process of preparing them and is a continuation-in-part of U. S. Patent No. 2,133,780 issued October 18, 1938 (application Serial No. 131,936, filed March 19, 1937, for: "Chromable dyestuffs of the triarylmethane series and process of preparing them" in the name of Wilhelm Eckert and Karl Schilling).

According to the present invention very clear dyestuffs of the triarylmethane series capable of being chromed are made by condensing 1 molecular proportion of 5-hydroxy-benzene-1.2.4-tricarboxylic acid or 3-hydroxybenzene-1.2.4-tricarboxylic acid (hydroxy-trimellitic acid) or the equivalent amount of the corresponding anhydride with 2 molecular proportions of a cyclic meta-dihydroxy compound having a reactive hydrogen atom, for instance, by melting the reagents at a temperature between about 150° C. and about 200° C. The dyestuffs may also be made by condensing, for instance, by melting at a temperature between about 150° C. and about 200° C., 1 molecular proportion of a benzoylbenzoic acid, which is obtainable by condensing 1 molecular proportion of one of the said hydroxy-trimellitic acids with only 1 molecular proportion of a cyclic meta-dihydroxy compound having a reactive hydrogen atom, or of a halogenation product of such benzoylbenzoic acid, with 1 mol of a cyclic meta-dihydroxy compound having a reactive hydrogen atom. In this operation there may be used condensing agents as, for instance, concentrated sulfuric acid or para-toluenesulfonic acid, whereby a lower reaction temperature, for instance, between about 70° C. and about 140° C. may be applied. The product may be halogenated subsequently.

The new dyestuffs dye animal fibers in an acid bath very clear yellow to red tints; by after-chroming them the properties of fastness are considerably enhanced. The dyestuffs are also suitable for chrome printing on cotton. The dyestuffs may also be chromed in substance whereby they are transformed into the corresponding chromium complex compounds which dye the fiber from an acid bath very clear shades which possess without after-chroming good fastness properties.

The formation of the dyestuff probably occurs, for instance, as follows:

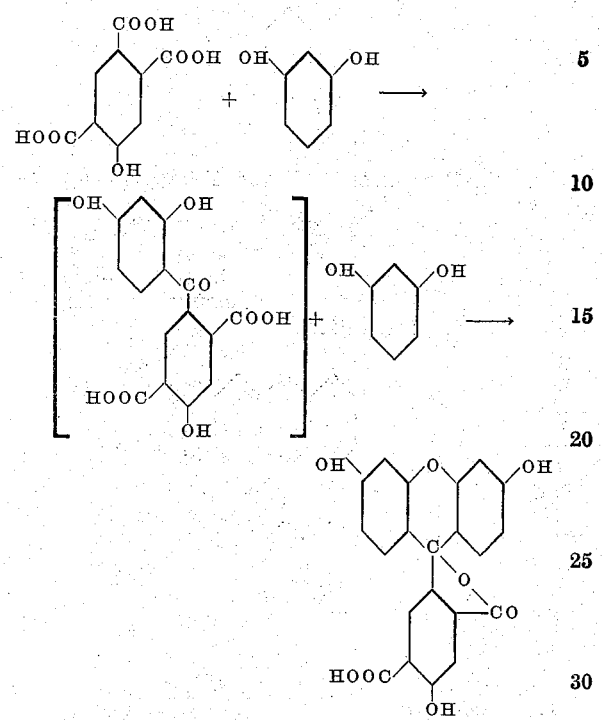

The dyestuffs obtainable according to the process of the present invention are new. There are, for instance, obtained dyestuffs of the following probable formula:

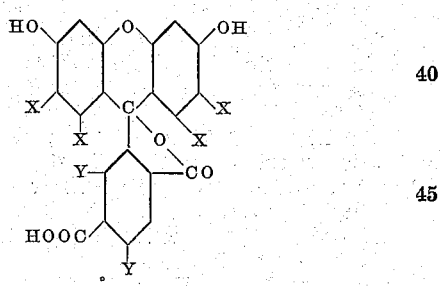

wherein the nuclei R may contain substituents as, for instance, hydroxy, methoxy, halogen, carboxy or sulfo or a condensed benzene nucleus in the positions X and wherein one Y represents hydroxy and the other Y hydrogen.

The same dyestuffs may also be characterized by one of the following formulae:

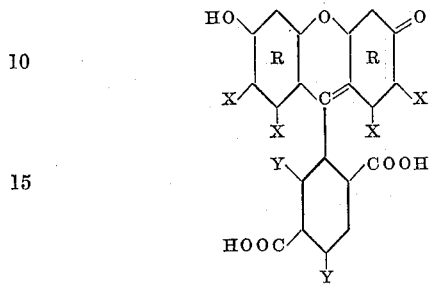

and

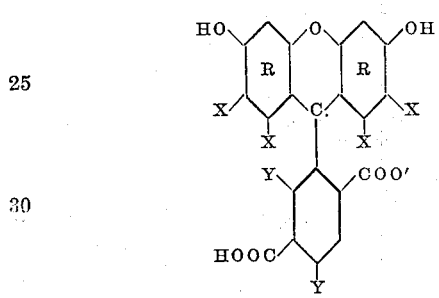

wherein the values R, X and Y have the above-indicated meaning.

It is not known with certainty whether the hydroxy-trimellitic acids react in the manner presumed. It is also possible that isomerides of the above-mentioned compounds are formed having the constitution:

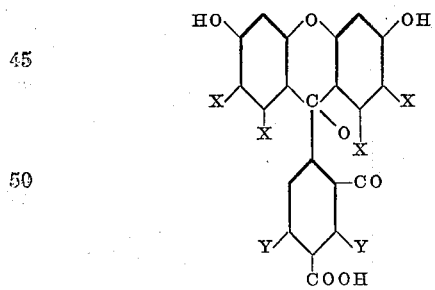

wherein the values R, X and Y have the above-indicated meaning, or that the products are mixtures of isomerides of the said formulae.

The following examples serve to illustrate the invention, but they are not intended to limit it thereto; the parts are by weight:

(1) 21 parts of 5-hydroxy-1.2.4-trimellitic anhydride and 22 parts of resorcinol are finely triturated and melted together. 7 parts of anhydrous zinc chloride are introduced into the mass, while stirring, and the whole is heated at 180° C. to 190° C. for 4 to 5 hours. During this time the melt solidifies. The mass is cooled and finely pulverized and then digested with 100 parts of hot hydrochloric acid of about 5 per cent. strength for some time. The undissolved yellow residue is filtered with suction while hot, dissolved in caustic soda solution, the solution is filtered and the yellow dyestuff is precipitated from the orange-red filtrate by means of dilute hydrochloric acid. For further purification the dyestuff may be recrystallized from aqueous alcohol. By dissolution in water with the necessary quantity of sodium bicarbonate and evaporation, the easily soluble orange-red sodium salt is obtained.

The dyestuff dyes animal fibers in an acid bath a very clear yellow tint; its properties of fastness are considerably enhanced by after-chroming.

(2) 39 parts of the yellow dyestuff described in Example 1 are suspended in 200 parts of glacial acetic acid and a solution of 34 parts of bromine in 100 parts of glacial acetic acid is added, drop by drop, while stirring. When the bromine has been absorbed, the orange-yellow dyestuff is filtered with suction, washed with a small quantity of glacial acetic acid and then washed with a large quantity of water until neutral to Congo paper. The dyestuff may be recrystallized from a large quantity of hot glacial acetic acid or aqueous alcohol. It dyes wool in an acid bath orange-yellow tints the fastness of which is enhanced by after-chroming.

(3) 39 parts of the dyestuff described in Example 1 are suspended in 200 parts of glacial acetic acid and a solution of 68 parts of bromine in 100 parts of glacial acetic acid is added drop by drop while stirring. When the bromine has been absorbed, the dyestuff is isolated and purified as indicated in Example 2. The dyestuff has probably the following constitution:

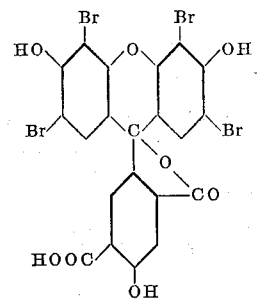

or represents an isomeride thereof or a mixture of isomerides. It dyes wool in an acid bath a very clear yellowish red tint the fastness properties of which are considerably enhanced by after-chroming.

(4) 21 parts of 5-hydroxy-trimellitic anhydride, 31 parts of beta-resorcylic acid and 14 parts of anhydrous zinc chloride are triturated and heated at 180° C. in an oil bath for several hours until the melt solidifies. After cooling, the crude product is pulverized and boiled with 200 parts of hydrochloric acid of 5 per cent. strength; the undissolved yellow dyestuff is filtered with suction while hot. It is dissolved in dilute sodium carbonate solution, yielding an orange-red solution with a green fluorescence; the solution is filtered and the dyestuff is precipitated by means of a dilute acid. For further purification the dyestuff may be recrystallized from aqueous alcohol.

40 parts of this dyestuff are suspended in 160 parts of alcohol and 64 parts of bromine are gradually added at ordinary temperature, while stirring. After standing for several hours the whole is diluted with double the volume of water, the precipitated red dyestuff is filtered with suction, washed until neutral to Congo paper and transformed into the sodium salt by dissolution in sodium bicarbonate solution and evaporation.

The dyestuff has probably the following constitution:

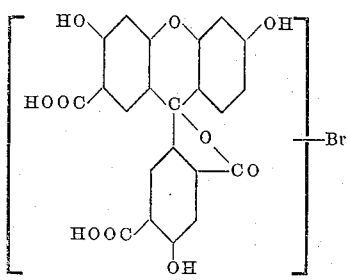

wherein the number and the position of the bromine atom or atoms are unknown.

Perhaps it is an isomeride thereof or a mixture of isomerides. The dyestuff dyes animal fibers in an acid bath very clear yellowish red tints; its fastness properties are considerably enhanced by after-chroming.

(5) 28 parts of 4-chloro-resorcinol, 20 parts of 5-hydroxy-trimellitic anhydride and 7 parts of anhydrous zinc chloride are finely triturated and heated at 180° C. in an oil bath until the melt solidifies, which occurs after about 5 hours. The pulverized melt is purified by boiling it with dilute hydrochloric acid, dissolving the undissolved residue in dilute caustic soda solution and reprecipitating it. For further purification the precipitate is dissolved by boiling it with barium hydroxide solution, the solution is filtered and the dyestuff is precipitated from the filtrate by acidification with dilute hydrochloric acid. The dyestuff dyes wool in an acid bath yellow tints which, by after-chroming, become darker and faster.

(6) 16 parts of 1.3-dihydroxy-naphthalene, 10 parts of 5-hydroxy-trimellitic anhydride and 4 parts of anhydrous zinc chloride are melted together as described in Example 5. The dyestuff is purified by boiling it with dilute hydrochloric acid, dissolving the insoluble residue in 250 parts of bicarbonate solution of 5 per cent. strength, filtering the solution and adding 60 parts of sodium chloride to the filtrate. After stirring for one hour the resulting dark precipitate is filtered with suction and the dyestuff is precipitated from the filtrate by means of dilute hydrochloric acid, washed with water and dried.

The dyestuff dyes animal fibers in an acid bath brown-red tints; the fastness properties are improved by after-chroming.

(7) 25 parts of pyrogallol, 21 parts of 5-hydroxy-trimellitic anhydride are melted together at 190° C. to 200° C. for 3 to 4 hours while excluding air. The pulverized melt is recrystallized from aqueous alcohol.

The dyestuff thus obtained has probably the following constitution:

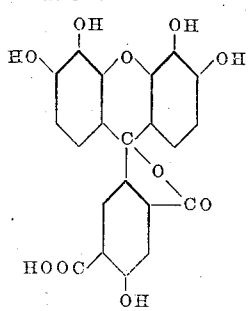

It may also be an isomeride of the above formula in which the positions of the ortho-situated hydroxyl and carboxyl groups are exchanged. The dyestuff dyes wool in an acid bath red shades, which on after-chroming become violet and possess very good fastness properties.

(8) 42 parts of the dyestuff obtainable by condensation of 2 molecular proportions of pyrogallol with 1 molecular proportion of 5-hydroxy-trimellitic anhydride are suspended in 200 parts of glacial acetic acid.

While quickly stirring, a solution of 32 parts of bromine, in 100 parts of glacial acetic acid, is added drop by drop. After consumption of the bromine the dyestuff is precipitated by means of water and recrystallized for purification from acetic acid of 50 per cent strength. It forms a red powder, which dissolves in bicarbonate solution to a red, and in caustic soda solution to a blue solution. The dyestuff probably possesses the following constitution:

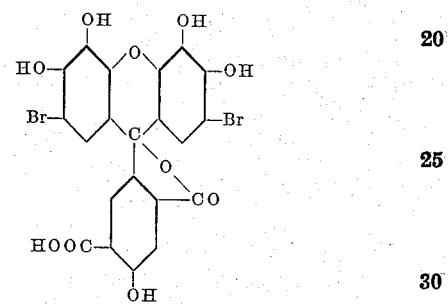

or is an isomeride thereof or a mixture of isomerides. The dyestuff dyes wool in an acid bath wine-red shades. The after-chromed dyeings are violet and possess essentially better fastness properties than the non-chromed dyestuff.

(9) 32 parts of 2'.4'-dihydroxy-2-benzoylortho-hydroxy-carboxy-1-benzoic acid having the following constitution:

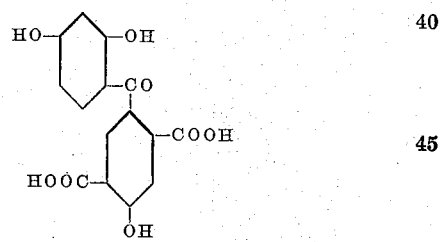

or

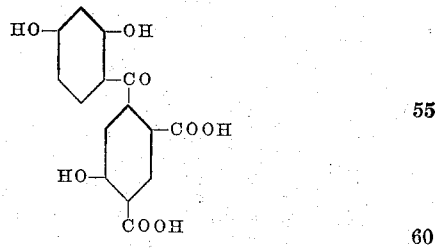

or a mixture of both isomerides (obtainable by condensation of one molecular proportion of 5-hydroxy-benzene-1.2.4-tricarboxylic acid with one molecular proportion of resorcinol, for instance, by heating the components at about 100° C. to about 120° C. in the presence of a solvent or diluent until the resorcinol is no longer detectable, or by treating the dyestuff of Example 1 with about 80 per cent. of caustic soda solution at about 150° C. for about one hour), are melted together with 20 parts of resorcinol for 4 to 5 hours at 180° C. The yellow melt is pulverized after cooling and dissolved in dilute caustic soda solution. The solution is heated to boiling and acidified with dilute hydrochloric acid. The yellow precipitate obtained is filtered with suction after cooling, washed until neutral and dried. The dyestuff may be recrystallized, if desired, from aqueous alcohol. On dissolution in dilute alkalies and evaporation of the solution the easily soluble sodium salt of the dyestuff is obtained.

The dyestuff dyes the animal fiber in an acid bath yellow shades. The fastness properties are essentially enhanced by after-chroming.

Instead of resorcinol there may also be used other meta-dihydroxy-compounds having a reactive hydrogen atom, as, for instance, chloro-, bromo-, nitro-, methyl-resorcinol or resorcinol-monomethyl ether and so on.

(10) By bromination of the dyestuff of Example 9, as indicated in Example 2, a dyestuff is obtained which possesses similar properties as described therein. If the bromination is conducted as described in Example 3, a dyestuff is obtained which dyes wool in an acid bath very clear yellowish red shades, the fastness properties of which are essentially enhanced by after-chroming.

(11) 32 parts of 2',4'-dihydroxy-2-benzoyl-ortho-hydroxy-carboxyl-1-benzoic acid (cf. Example 9) and 17 parts of beta-resorcylic acid are introduced into about 20 parts of concentrated sulfuric acid and heated at 70° C. to 80° C. for about 6 hours, while stirring. Thereupon the mixture obtained is introduced into about 100 parts of water, the solution is saturated by means of sodium chloride and the yellow precipitate obtained is filtered with suction. In order to eliminate any unchanged 2',4'-dihydroxy-2-benzoyl-ortho-hydroxy-carboxy-1-benzoic acid from the yellow residue, it is stirred with about 25 parts of slaked lime and 250 parts of water and boiled again. After cooling the difficulty soluble calcium salt of the dyestuff is filtered with suction, washed with water and the yellow dyestuff is freed therefrom by means of dilute acids. With the condensation there occurs simultaneously sulfonation and the dyestuff possesses probably the following constitution:

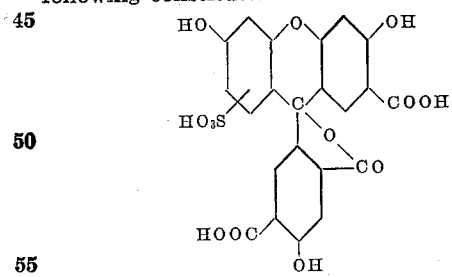

or is an isomeride thereof or a mixture of isomerides. The dyestuff dyes wool in an acid bath yellow shades. The fastness properties are essentially enhanced by after-chroming.

On after-broming in alcohol or glacial acetic acid there are obtained dyestuffs the shades of which turn gradually red pari passu with the number of bromine atoms absorbed.

(12) 16 parts of 2',4'-dihydroxy-2-benzoyl-(ortho-hydroxy-carboxy)-1-benzoic acid (cf. Example 9) and 7.5 parts of pyrogallol are melted together at 160° C. to 170° C. for 4 hours while excluding air and stirring.

The pulverized melt is dissolved in sodium carbonate solution of 5 per cent. strength and filtered.

The red solution is heated to boiling and acidified with dilute hydrochloric acid until the reaction becomes feebly acid to Congo paper. After standing for several hours the precipitated dyestuff is filtered with suction, washed with water several times and dried. The dyestuff dissolves in sodium carbonate or bicarbonate solution to a red, and in dilute caustic soda solution to a green solution. It dyes wool in an acid bath brown-red shades. The after-chromed dyeings show, according to the strength of the dyeing, grey to deeply black shades, the fastness of which is considerably enhanced compared with the non-chromed dyeings.

(13) 40 parts of 2',4'-dihydroxy-2-benzoyl-(ortho-hydroxy-carboxy)-1-benzoic acid (cf. Example 9) and 20 parts of 1.3-dihydroxynaphthalene are heated at 150° C. to 160° C. for 4 hours. The pulverized melt is dissolved in bicarbonate solution and the solution obtained is boiled for half-an-hour with about 1 part of animal charcoal. The dyestuff is precipitated from the hot filtered yellow-red solution with dilute hydrochloric acid. After cooling entirely the dyestuff is isolated in the usual manner. For further purification it may be recrystallized from a large quantity of glacial acetic acid or dioxane. The dyestuff forms a yellow-red, indistinct crystalline powder. It dissolves in bicarbonate solution to a yellow-red solution having a yellow fluorescence. It dyes wool in an acid bath clear golden-yellow shades. The chromed dyeings are brown and show enhanced fastness properties.

(14) 24 parts of 2',4'-dihydroxy-2-benzoyl-(ortho-hydroxy-carboxy)-1-benzoic acid, (cp. Example 9), 10½ parts of phloroglucin and 22 parts of para-toluene-sulfonic acid are heated at 120° C. to 130° C. for 3 to 4 hours. The pulverized melt is stirred with about 100 parts of water and the dyestuff is filtered with suction from the solution containing toluene-sulfonic acid. The dyestuff is dissolved in sodium carbonate solution, filtered, the red solution obtained is boiled with 1 part of animal charcoal, filtered, and the dyestuff is precipitated from the cooled solution by means of dilute hydrochloric acid. It dyes wool in an acid bath orange-yellow shades. On after-chroming essentially faster brown dyeings are obtained.

(15) 95 parts of 2',4'-dihydroxy-3',5'-dibromo-2-benzoyl-(ortho-hydroxy-carboxy)-1-benzoic acid, which is obtainable from the bromine-free compound (cp. Example 9) by bromination in alcohol with the necessary quantity of bromine, 30 parts of pyrogallol and 150 parts of para-toluene-sulfonic acid are melted together at 120° C. to 130° C. for about 4 hours while excluding air. The cooled pulverized melt is stirred in 1000 parts of water and the dyestuff is filtered with suction. The brown-black residue is dissolved in sodium carbonate solution. The solution obtained is filtered and the dyestuff is precipitated therefrom by means of dilute hydrochloric acid. For further purification it may be recrystallized from acetic acid of 50 per cent. strength. The dyestuff dyes wool in an acid bath. On after-chroming it becomes black and the fastness properties are enhanced.

(16) 32 parts of 2',4'-dihydroxy-2-benzoyl-(ortho-hydroxy-carboxy)-1-benzoic acid and 16 parts of 4-chlororesorcinol are melted together at 160° C. to 170° C. for 4 hours. It is further worked up as described in the foregoing example. The dyestuff dyes wool in an acid bath orange-yellow tints. The after-chromed dying is brown and essentially faster.

(17) 31.8 parts of 2',4'-dihydroxy-2-benzoyl-ortho-hydroxy-carboxy-1-benzoic acid (cp. Example 9), 40 parts of the potassium salt of resorcinol-4.6-disulfonic acid and 27.0 parts of concentrated sulfuric acid are heated at 30° C. to 100° C. for about 2 to 10 hours. The condensation can also be effected without heating, a longer time being necessary. The whole is then diluted with 1000 parts of water whereby the dyestuff is precipitated. The dyestuff is filtered with suction, washed with water until neutral and may be recrystallized and purified by dissolution in dilute caustic soda solution, filtration and precipitation by means of dilute hydrochloric acid. The dyestuff forms a canary-yellow powder and possesses probably the following constitution:

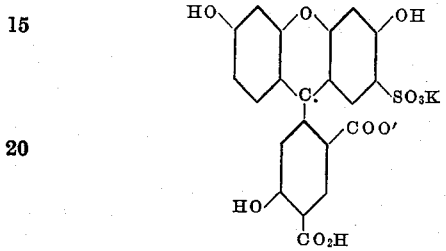

or

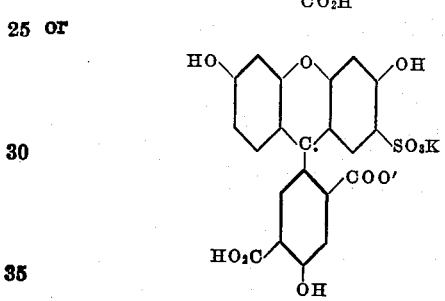

(18) 31.8 parts of 2'.4'-dihydroxy-2-benzoyl-ortho-hydroxy-carboxy-1-benzoic acid (cp. Example 9), 13.8 parts of 4-ethyl-resorcinol (cp. Berichte der Deutschen Chemischen Gesellschaft, vol. 47, page 54) and 27 parts of concentrated sulfuric acid are condensed under the conditions described in Example 17 and worked up as described therein. The dyestuff obtained forms a canary-yellow powder.

We claim:

1. The compounds of the general formula:

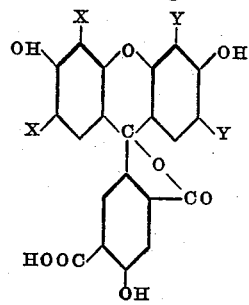

wherein X represents a member of the group consisting of hydrogen, bromine and sulfonic acid, one Y represents a member of the group consisting of hydroxyl, carboxyl and alkyl, and the other Y represents hydrogen and the chromium complex compounds thereof.

2. The compound of the formula:

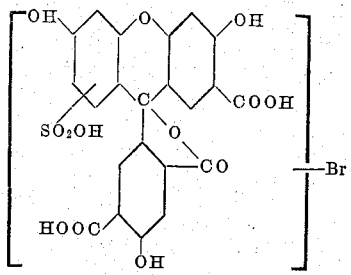

being a dyestuff which dyes wool from an acid bath red tints the fastness properties of which are essentially enhanced by after-chroming.

3. The compound of the formula:

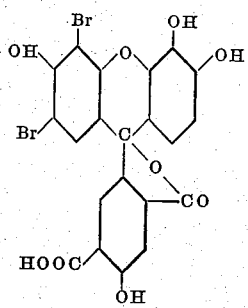

being a dyestuff which dyes wool from an acid bath red tints the fastness properties of which are essentially enhanced by after-chroming.

4. The compound of the formula:

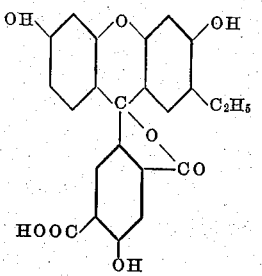

being a dyestuff which forms a canary-yellow powder and dyes wool from an acid bath yellow tints the fastness properties of which are essentially enhanced by after-chroming.

WILHELM ECKERT.
KARL SCHILLING.